K. METZDORFF.
MEASURING THE QUANTITY OF FLUID FLOWING THROUGH PIPES.
APPLICATION FILED MAY 28, 1914.
1,120,214. Patented Dec. 8, 1914.
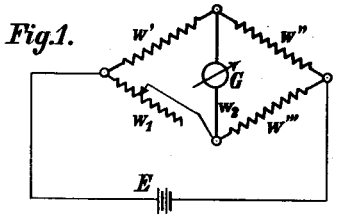
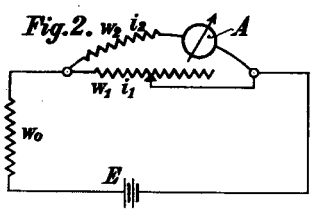
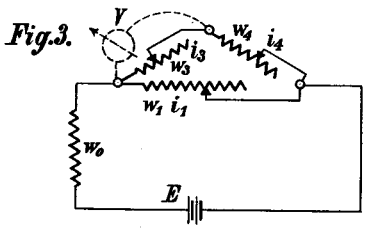
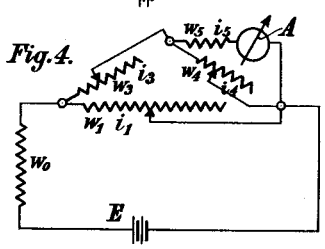
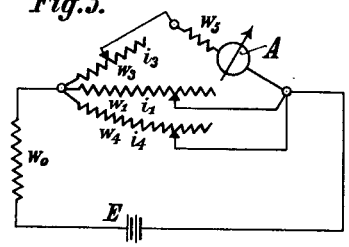
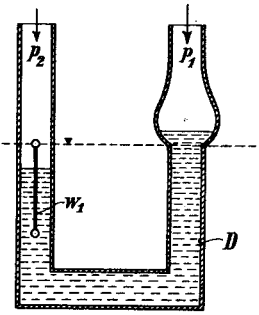
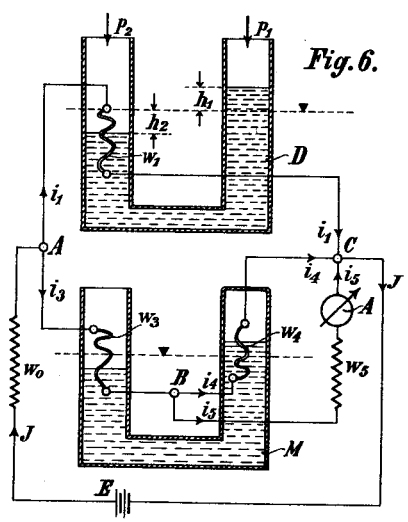
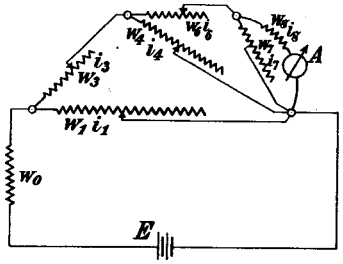
Witnesses:
Chas E. Whiteman
H. D. Penney
Inventor:
Kurt Metzdorff,
By his Att'y, T. H. Richards.

UNITED STATES PATENT OFFICE.

KURT METZDORFF, OF BERLIN-TEGEL, GERMANY.

MEASURING THE QUANTITY OF FLUID FLOWING THROUGH PIPES.

1,120,214. Specification of Letters Patent. Patented Dec. 8, 1914.

Application filed May 28, 1914. Serial No. 841,439.

*To all whom it may concern:*

Be it known that I, KURT METZDORFF, engineer, a subject of the King of Prussia, residing in Gasanstalt 6, Berlin-Tegel, Germany, have invented certain new and useful Improvements in Measuring the Quantity of Fluid Flowing Through Pipes, of which the following is a specification.

A known method of measuring the quantity of gas, liquid, or steam flowing through pipes, consists in producing at one point of the pipe, a throttling, for instance by a float, nozzle, throttle-disk or the like. Another method makes use of the pressure difference existing between the static and dynamic pressure of the flowing gas or steam. In both cases, the flowing quantity is proportionate to the root of this pressure difference, and if the density is variable, it is also proportionate to the root of the specific volume.

The present invention relates to an improved method of, and means for measuring or continuously recording by means of this pressure difference in an electric way the flowing quantity with constant and variable density. Other electric measuring methods, which serve for the same purpose, are already known, over which the subject matter of the present invention has the advantage of greater simplicity.

Figure 1 is a diagram showing a well known form of connection for measuring flowing quantities, Fig. 2 is a diagram showing the connections and resistances used in the present invention, Fig. 3 is a diagrammatic showing of a form of the invention by which density changes can also be measured, Figs 4, 5 and 10 are further modifications of the invention, Fig. 6 is a diagrammatic view showing the form of Fig. 4 connected to a mercury tube or manometer which is effected by the pressures of the flowing quantities, and Figs. 7, 8 and 9 show diagrammatically different forms of resistances and tubes which are employed.

The measuring of the flowing quantity with constant specific volume is effected in such a way that a resistance in an electric circuit is so changed by means of suitable apparatus of any kind, which are influenced by the pressure difference, that the intensity of the current in a second constant resistance belonging to the same circuit, or the potential difference existing at the ends of said resistance respectively, is always proportionate to the root of the pressure difference. For this purpose, a connection of any suitable kind may be employed. In Fig. 1, for instance, a known bridge connection, which has been previously employed for the same purpose, is used. The resistance $w_1$ to be influenced by the pressure difference together with three constant resistances $w'$, $w''$, $w'''$ is combined in a Wheatstone bridge and is automatically changed by the pressure difference so that the galvanometer current is proportionate to the root of the pressure difference.

A novel, simple connection according to the present invention, which serves also for the measurement of the pressure difference only, that is for the first part of the method, is represented in Fig. 2. A resistance $w_0$ is connected in series with two parallel resistances $w_1$ and $w_2$, of which $w_2$ is constant, while $w_1$ is so changed by the pressure difference that the current $i_2$ flowing in the resistance $w_2$ is proportionate to the root of the pressure difference. If $p_2 - p_1$ designates the pressure difference, E the voltage of the electric power source, and $a_1$, $a_2$, $a_3$, and so on, constant magnitudes, then $$i_2 = a_1 \sqrt{p_2 - p_1}.$$

For the change of $w_1$, the connection results in the following law:

$$w_1 = \frac{w_2 \cdot w_0}{\dfrac{E}{a_1 \sqrt{p_2 - p_1}} - w_2 - w_0}.$$

The resistance $w_0$ is not influenced by the change of the pressure difference, but is only regulated from time to time in order to neutralize any occurring voltage changes of the electric power source. Besides, it serves for creating a law, favorable for the practical change of the resistance $w_1$. Assuming $w_0$ omitted, the resistance $w_2$ could not be made constant but would be liable to change also with the pressure difference. For, with the pressure difference O, which corresponds to a flowing quantity Q, $w_2$ must else be infinitely large, in order that the current $i_2$ corresponding to the flowing quantity becomes =O. This is, however, cumbrous for practical execution.

In order to consider changes of the density, according to the present invention, the resistance $w_2$ of the connections in Figs. 1 and 2, or of other equivalent connections respectively, is replaced by two resistances connected in series. In Fig. 3, for instance, the connection of Fig. 2 completed in this way is shown. The resistances $w_3$ and $w_4$, which replace $w_2$, are now so influenced by the specific volume $v$ that one partial resistance, for instance $w_3$, is always changed proportionate to $\sqrt{v}$ and at the same time supplemented by the other resistance to the constant sum $$w_3 + w_4 = w_2.$$

The change of $w_1$ is effected in the same way as in the connection of Fig. 2. Consequently, the current $i_3$ flowing in the resistance $w_3$ is identical with the current $i_2$ (Fig. 2), that is $$i_3 = a_1 \sqrt{p_2 - p_1},$$

the product $i_3.w_3$ being then proportionate to $$\sqrt{p_2 - p_1}.\sqrt{v}.$$

Thus, the potential difference existing at the ends of the resistance $w_3$ and which is measured in voltmeter V, is a measure for the flowing quantity having a variable specific density.

Another modification of the connection of Fig. 2 is represented in Fig. 4. The resistance $w_2$ is divided into a partial resistance $w_3$ and two parallel resistances $w_4$ and $w_5$ connected in series with $w_3$, an ammeter A being inserted therein. The resistance $w_2$ (Fig. 2) is then replaced by $w_3$ and the resistance of the divided circuit may be expressed by $$w_x = \frac{w_4.w_5}{w_4 + w_5}.$$

Thus, $$w_3 + w_x = w_2.$$

The resistance $w_5$ remains constant, whereas $w_3$ and $w_4$ are arranged to be so influenced by the changes of density that the sum $w_3 + w_x$ remains constant and at the same time the partial current $i_5$ is changed proportionately to $\sqrt{v}$. The sum $w_3 + w_x$ can be expressed by the constant resistance $w_5$ and a constant $$w_3 + w_x = a_3.w_5.$$

The resistance $w_1$ is, as in the connection of Fig. 2, so influenced by the changes of the pressure difference that $$i_3 = a_1 \sqrt{p_2 - p_1}.$$

The current $i_3$ is not influenced by the variations in the specific volume, owing to the invariable magnitude of the sum $w_3 + w_x$. As now $i_5$ is also proportionate to $i_3$, $i_5$ will always be proportionate to $$\sqrt{v}.\sqrt{p_2 - p_1}.$$

The change of the three resistances $w_1$, $w_3$, $w_4$ must be effected as follows, as can be seen from the connection in Fig. 4:

I. $w_1 = \dfrac{a_3.w_5.w_0}{\dfrac{E}{a_1\sqrt{p_2-p_1}} - a_3.w_5 - w_0}$

II. $w_3 = a_3.w_5 - a_2.\sqrt{v}.w_5$

III. $w_4 = \dfrac{a_2\sqrt{v}.w_5}{1 - a_2.\sqrt{v}}$

A third way of considering the varying specific volume is shown in the connection in Fig. 5, which shows a further modification of the connection in Fig. 2. The constant resistance $w_2$ (Fig. 2) is replaced by two parallel resistances, of which one consists of two partial resistances connected in series. $w_1$ is, like in the connection of Fig. 2, so changed by the pressure difference that the sum of the partial currents $i_3 + i_4$ is proportionate to $$\sqrt{p_2 - p_1}.w_5$$

is constant, while $w_3$ and $w_4$ are influenced by the specific volume. This change is so effected that the branch resistance $w_x$, formed by $w_3 + w_5$ and $w_4$, $$= w_4 \frac{(w_3 + w_5)}{w_4 + w_3 + w_5}$$

and remains always constant, while at the same time the current $i_5$ flowing in the constant resistance $w_5$ becomes proportionate to $\sqrt{v}$. As $i_5$ is further proportionate to the sum of the branch currents $$i_3 + i_4, i_5 = a_1 \sqrt{p_2 - p_1}.a_2.\sqrt{v}.$$

As the branch resistance $w_x$ is constant, it can also be expressed by $w_5$ as follows:

$$w_x = a_3.w_5.$$

For the laws, according to which $w_1$, $w_3$, $w_4$ must be changed by the pressure difference or the specific volume respectively, the following formulas result from the connection:

IV. $w_1 = \dfrac{a_3.w_5.w_0}{\dfrac{E}{a_1\sqrt{p_2-p_1}} - a_3.w_5 - w_0}$

V. $w_3 = \dfrac{a_3.w_5}{a_2.\sqrt{v}} - w_5$

VI. $w_4 = \dfrac{a_3.w_5}{1 - a_2\sqrt{v}}.$

The above-described connection allowed the consideration of two factors only, namely the pressure difference, between the flowing quantity and the specific volume. The method can by a simple repetition also be used for considering more than two factors; for instance, when measuring steam, besides the pressure also the temperature can be considered. This is for instance shown in Fig. 10 based on the connection illustrated in Fig. 4. The constant resistance $w_5$ (Fig. 4) is replaced by the variable resistances $w_6$ and $w_7$ and the constant resistance $w_8$. $w_6$ and $w_7$ are so influenced by steam temperature that the total resistance $$w_6 + \frac{w_7 \cdot w_8}{w_7 + w_8}$$

and thus also the current $i_6$, which is already proportionate to the root from the pressure difference as well as to the root from the steam pressure, remains invariable, while at the same time the partial current $i_8$, which is always proportionate to $i_6$, receives a correction corresponding to the variable steam temperature. Then, $i_8$ is a measure for the steam quantity also with variable pressure and variable temperature. It must be noted that in the same way, as shown by the above description in respect of the connection in Fig. 2, the connection in Fig. 1 can also be modified by a corresponding construction of $w_2$ for the purpose of considering changes of the density of the flowing quantity.

In the above formulas, the resistances of the supply wires are neglected. They can, however, be considered as constant additional resistances by corresponding alteration of the formulas. In the same way, other constant resistances may be added to the variable ones of the single branches, without departing from the principle of the connections.

The method can be employed for measuring quantities of gas, steam or liquids. It may also serve as a supplement to hitherto known measuring methods or measuring devices, whether it be for allowing a distant indication or a continuous counting, or for correcting the measurements corresponding to the varying specific volumes. Of course, with the improved method, also other laws besides those named may be considered; this would, for instance, apply if the method would be employed in connection with measuring instruments, in which by a change of the throttling cross-section the pressure difference is kept constant. Instead of the root of the pressure difference, in the formulas a function of the variable cross-section would then be inserted.

Hereinafter, a device is described which is constructed according to the improved method and which serves particularly for measuring steam. In this connection, the known mercury differential manometer is employed, the oscillations of the mercury columns being electrically put into action in a novel way.

As the measuring of steam is generally effected by determining its weight, with varying condition of the steam the correction must be applied corresponding to the specific weight. As pressure and specific weight, apart from superheating, are almost proportional, a gage or manometer is employed for the correction according to the varying pressure. This gage or manometer may be of any kind; for instance, a tubular or piston-gage or manometer may be employed, which is provided with suitable devices for changing the resistances $w_3$ and $w_4$ (Figs. 3 to 5) in the required way.

With the device hereinafter described, for instance a mercury gas gage or manometer is used, which is constructed in a novel way for the present purpose.

The whole measuring device is represented in Fig. 6, the same being based on the connection in Fig. 4. Instead of the latter, also those shown in Figs. 1, 3 and 5 may be employed.

The two members of the mercury differential gage or manometer D are acted upon by the pressures $p_1$ and $p_2$ of a pressure difference produced in the steam current by one of the known methods. If $h_1$ and $h_2$ designate the oscillations of the mercury columns in both members from the zero position, $h_1 + h_2$ is proportionate to $p_2 - p_1$, and the steam quantity Q is, without regard to the variable pressure, proportionate to $$\sqrt{h_2 + h_1},$$

that is $$Q = a_4 \cdot \sqrt{h_2 + h_1}.$$

The gage or manometer M serves for the correction of the measurements according to the variable pressure. Said gage or manometer consists of two communicating tubes, one being open and the other closed and both filled to a certain mark with mercury. The closed member contains above the mercury column a certain quantity of air or gas. The open member is in communication with the steam pressure. According to whether the latter rises or falls, the two mercury columns in the members are displaced and the inclosed air or gas quantity is more or less compressed.

In one member of the differential gage or manometer D, the resistance $w_1$ is inserted. The resistances $w_3$ and $w_4$ are located in the members of the gage or manometer M.

From a power source E, the main current J flows through the series resistance $w_0$ and is divided at A corresponding to the amount of the resistances $w_1$ and $w_3$ into the branch currents $i_1$ and $i_3$. The latter is again divided at B into the currents $i_4$, $i_5$ corresponding to the parallel resistances $w_4$, $w_5$. At C the three partial currents $i_1$, $i_4$ and $i_5$ are combined and flow back to the power source.

The resistance $w_1$ must be so changed by the rising or falling mercury column that $i_s$ becomes proportionate to $$\sqrt{p_2-p_1}$$

or to $$\sqrt{h_1+h_2}$$

respectively. For this purpose, with the height also the length and at the same time the cross-section of the inserted resistance can be correspondingly varied, or with constant cross-section the length alone.

A constructional form of the latter case is shown in Fig. 6 and on a larger scale in Fig. 7. A wire-shaped resistance of constant cross-section is wound in a cylindrical helix with variable pitch. The size of the resistance $w_1$ is then proportionate to its liberated length $l$, that is $$w_1 = a_5 . l.$$

The change of the angle of the pitch must be so chosen that the length $l$ of the resistance, corresponding to any oscillation $h_1$ of the differential gage or manometer M, has such a value that the current voltage $i_3$ in the resistance $w_3$ is proportionate to $$\sqrt{h_1+h_2}.$$

The law, according to which the pitch of the helix must change with its height, results from the formula I, in replacing $p_2-p_1$ and $w_1$ by the corresponding values $h_1+h_2$ and $l$.

In another construction (Fig. 8) $w_1$ is wound in a helical wire of constant pitch by making the radius of the windings correspondingly variable.

In a third construction (Fig. 9) a straight wire is employed, and the cross-section of one or both members of the differential gage or manometer is made correspondingly variable.

The resistances of the gage or manometer M located in the members of the gage are influenced by the rising and falling mercury columns. As long as the steam pressure remains constant, the height of the mercury columns and thus the size of the resistances $w_3$ and $w_4$ remains constant. The current $i_5$ then changes proportionately to the total current $i_3$, that is proportionately to $$\sqrt{p_2-p_1}$$

or $$\sqrt{h_1+h_2}.$$

With a pressure variation, the mercury column in one member rises while that in the other member falls. Thereby, one resistance is reduced while the other is increased. The form of the resistances must be so chosen that, corresponding to the connection in Fig. 4, the sum $w_3+w_2$ remains constant and the current voltage $i_5$ becomes proportionate to $$\sqrt{p} \cdot \sqrt{p_2-p_1}.$$

This can be attained in the same way as with the resistance located in the differential gage.

The laws, according to which the resistances, or the members of the gage must be formed, can be derived from the formulas II and III by replacing the specific volume $v$ by the pressure $p$.

What I claim, is:—

An apparatus for measuring flowing fluids comprising a current source, a circuit including a constant-resistance connected in series with a plurality of variable resistances, said variable resistances being wound so that the current passing therethrough is proportionate to the square root of the pressure differences, and means for varying said resistances according to the fluid pressure.

In witness whereof I have hereunto signed my name this 15' day of May 1914, in the presence of two subscribing witnesses.

KURT METZDORFF.

Witnesses:
 WOLDEMAR HAUPT,
 HENRY HASPER.